United States Patent [19]
Yamaoka et al.

[11] 3,831,690
[45] Aug. 27, 1974

[54] TRACTOR DRIVING AND STEERING ARRANGEMENT

[75] Inventors: Kojiro Yamaoka, Nishinomiya; Toshiro Azuma; Koichiro Fujisaki, both of Toyonaka, all of Japan

[73] Assignee: Kanzaki Kokyukoki Mfg. Co., Inadera, Amagasaki, Japan

[22] Filed: July 23, 1973

[21] Appl. No.: 381,897

[30] Foreign Application Priority Data
Oct. 26, 1972 Japan.................. 47/124219[U]
May 23, 1973 Japan...................... 48/60965

[52] U.S. Cl. .............................. 180/6.66, 74/665 T
[51] Int. Cl. .......................................... B62d 11/06
[58] Field of Search.................... 180/6.2, 6.7, 6.66; 74/665 T, 665 GC

[56] References Cited
UNITED STATES PATENTS
2,975,851  3/1961  Youmans et al.................. 180/6.2
3,017,941  1/1962  Baker................................. 180/6.2

FOREIGN PATENTS OR APPLICATIONS
863,238  3/1961  Great Britain..................... 180/6.7

*Primary Examiner*—David Schonberg
*Assistant Examiner*—John A. Pekar

[57] ABSTRACT

A tractor comprising a pair of power transmitting means which connect engine output to left and right final drive means individually, each of said power transmitting means including a first fluid actuated clutch means for connecting said final drive means associated with said each of the power transmitting means to the engine output so as to drive the final drive means in forward direction and a second fluid actuated clutch means for connecting said final drive means associated with said each of the power transmitting means to the engine output so as to drive the final drive means in backward direction, a pair of control valve means having spools for controlling supply of pressure fluid to said clutch means, a single maneuvering lever, and connecting means connecting said lever and said spools and having a first connecting member for displacing both of said spools in a same direction and a second connecting member for displacing the spools in opposite directions. By manually operating said single maneuvering lever the left and right final drive means can be driven to rotate so as not only to stop, advance and retreat the tractor but to spin-turn the tractor to the left and right and further to turn the tractor to the left and right with an optional radius of turn by combining the operation of said maneuvering lever with manual operation of brakes for the final drive means.

9 Claims, 35 Drawing Figures

TRACTOR DRIVING AND STEERING ARRANGEMENT

This invention relates to a novel and improved tractor, and more particularly to a tractor which is excellent in maneuverability and is very suitable for use in conjunction with earth working and earth moving operations.

One of the important uses for tractors is in conjunction with earth working and earth moving operations in which operating load on the tractor is great and which requires considerable maneuvering with frequent changes in the speed and direction of the tractor. Consequently, in such operations, the tractor is required to be easily and readily maneuvered with as little strain as possible on the tractor power unit. Further, for the purpose of reducing area or space required in loading operation or the like with a front end loader or another material handling component, the tractor is, of course, required to be turned with as small radius for turning as possible.

As tractor proposed according to such requirements, there are ones disclosed in U.S. Pat. No. 3,231,117 and U.S. Pat. No. 3,017,941. In each of these tractors, power transmitting means for drivingly connecting left and right final driving means to an engine on the tractor is provided with individually actuated clutch means for the left final drive means and the right final drive means, said clutch means being actuated by manually operable control levers so that direction of rotation of the left and right final drive means is controlled independently and selectively, whereby maneuverability of the tractor is enhanced. In particular, each of said tractors is excellent in maneuverability in that the tractor can be spun about its center, namely can be made to do a so-called spin-turn, by driving the left and right final drive means to rotate in opposite directions, to permit the tractor to be turned with as small area or space for turning as possible.

These improved tractors according to the prior art have, however, some further disadvantages. For example, in the tractor according to U.S. Pat. No. 3,231,117, said clutch means are composed of frictional clutches operated by mechanical operating means so that a considerable force is required for engaging the clutches. Further, in both of the tractors disclosed in said U.S. Patents, the clutch or clutches for the left final drive means and the clutch or clutches for the right final drive means are operated by separate maneuvering levers respectively so that the operator must use both of his hands for maneuvering the tractor. The operator must, therefore, take one of his hands off the handling lever for operating the material handling component in order to handle one of the maneuvering levers to maneuver the tractor. The required period of time for each cycle of material handling operation including various maneuvers of the tractor is therefore prolonged, and this is obviously a serious disadvantage. It is true that this disadvantage can be avoided by substituting a pedal for the handling lever for operating the material handling component. In this case, however, operator's fatigue is considerable. Furthermore, in an earth working or earth moving operation, changes in the speed of forward travel of the tractor are often made. In each of the tractors disclosed in said U.S. Patents, a further handling lever for such speed changes is provided so that operator must place one of his hands on this handling lever by removing said hand from one of the maneuvering levers for making such speed changes, thereby prolonging the required time for each cycle of material handling operation and resulting in further reducing operation efficiency.

Accordingly, a primary object of the present invention is to provide a tractor which affords easy and ready maneuvering so that efficiency of earth working operation, earth moving operation or the like is enhanced.

Another object of the present invention in accordance with the above object is to provide a tractor which the operator can maneuver so as to turn the same with a small radius for turning by handling a single maneuvering lever so that the operator may turn the tractor by one of his hands while holding a handling lever for operating the material handling component with the other hand, whereby the required time for a cycle of earth working or earth moving operation is shortened and the efficiency of the operation is enhanced.

Still another object of the present invention is to provide an improved tractor vehicle or drive means therefor wherein the maneuvering lever for the tractor vehicle may be handled with ease.

A specific object of the present invention is to provide an improved tractor wherein changes in speed of advance of the tractor may be made by handling a single maneuvering lever.

A further object of the present invention is to provide a novel tractor which may be freely turned on various radii at the operator's selection.

A still further object of the present invention is to provide a tractor wherein change-over among various maneuvering may be made with safety and in a reliable manner.

A further specific object of the present invention is to provide an improved tractor which may be stopped readily during an earth working or earth moving operation in a reliable manner.

Other objects and advantages of the present invention will become more readily apparent as the specification is considered in conjunction with the accompanying drawings, in which:

FIG. 7 is a sectional view of transmission taken along line VII—VII of FIG. 4;

Figure 1:
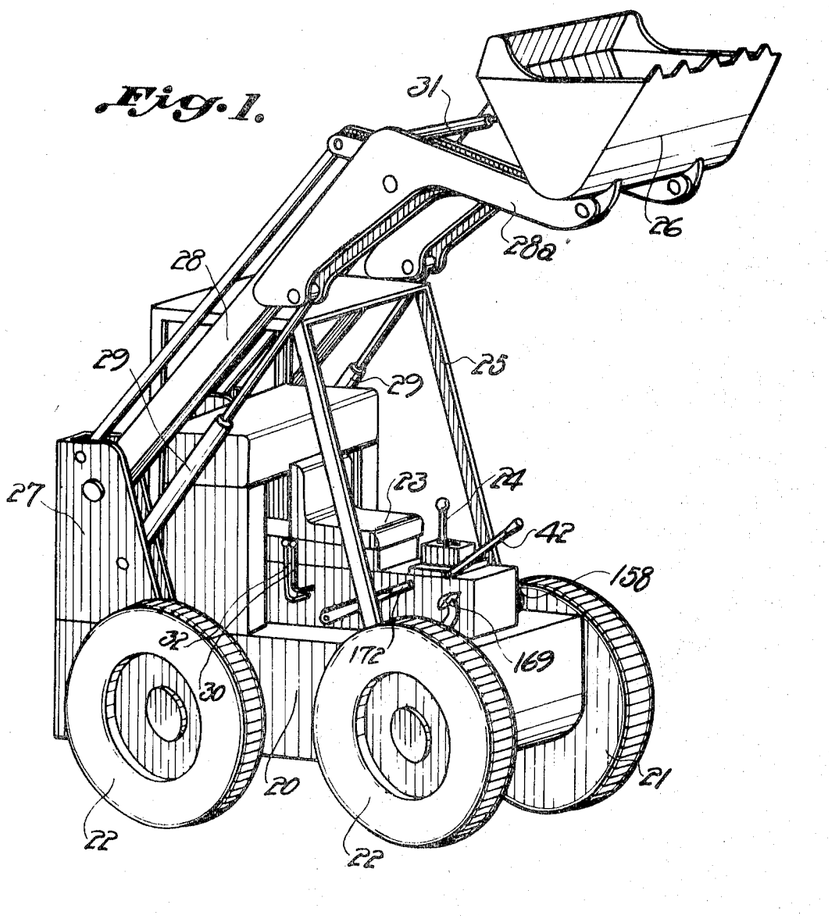
FIG. 1 is a perspective view, partially omitted, of an embodiment of the tractor according to the present invention.

Referring now to the drawings, there is shown a preferred embodiment of the tractor according to the present invention in FIGS. 1 through 19. As shown in FIG. 1, the tractor has an elongated frame structure 20 which supports a pair of left wheels 21 and a pair of right wheels 22 at opposite sides thereof. Further, as shown in FIG. 1, the tractor is provided with an operator's seat 23 on the frame structure 20 at a rearward portion thereof, a single maneuvering lever 24 in front of the seat for maneuvering the tractor vehicle, and a safety frame having ribs 25 around the seat 23. The other parts of the safety frame are omitted in the drawings. The illustrated tractor is shown mounting a hydraulically operated shovel-type bucket or front end loader 26 which is pivotally supported by downwardly curved front ends 28a of a pair of lifting arms 28 which in turn are pivotally supported respectively at the rear ends thereof by upper ends of a pair of vertical stanchions 27 projected upwardly from adjacent the rear end of the frame structure 20 and are extended forwardly along the frame structure. The bucket 26 is lifted through the lifting arms 28 by a pair of hydraulic cylinder units 29 which are actuated by a manually operated handling lever 30. Control of the position of the bucket 26 relative to the portion 28a is obtained by a pair of hydraulic cylinder units 31 which are actuated by a manually operated handling lever 32.

Figure 2:
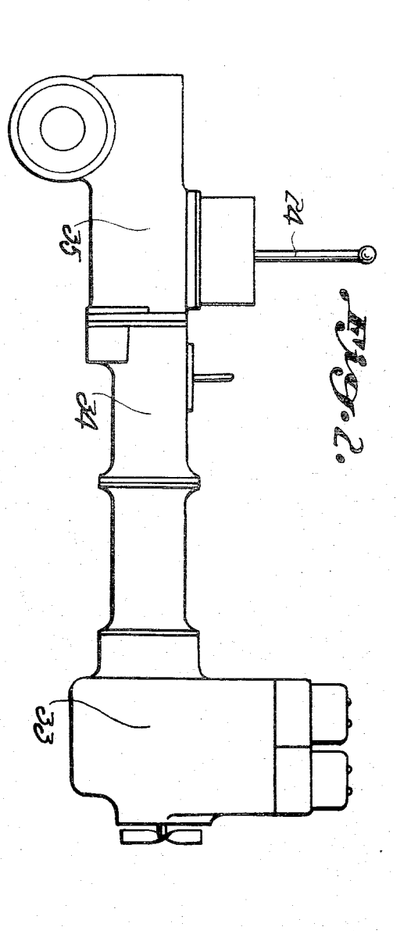
FIG. 2 is a schematic side view of engine and housings arranged in the tractor shown in FIG. 1.
Figure 3:
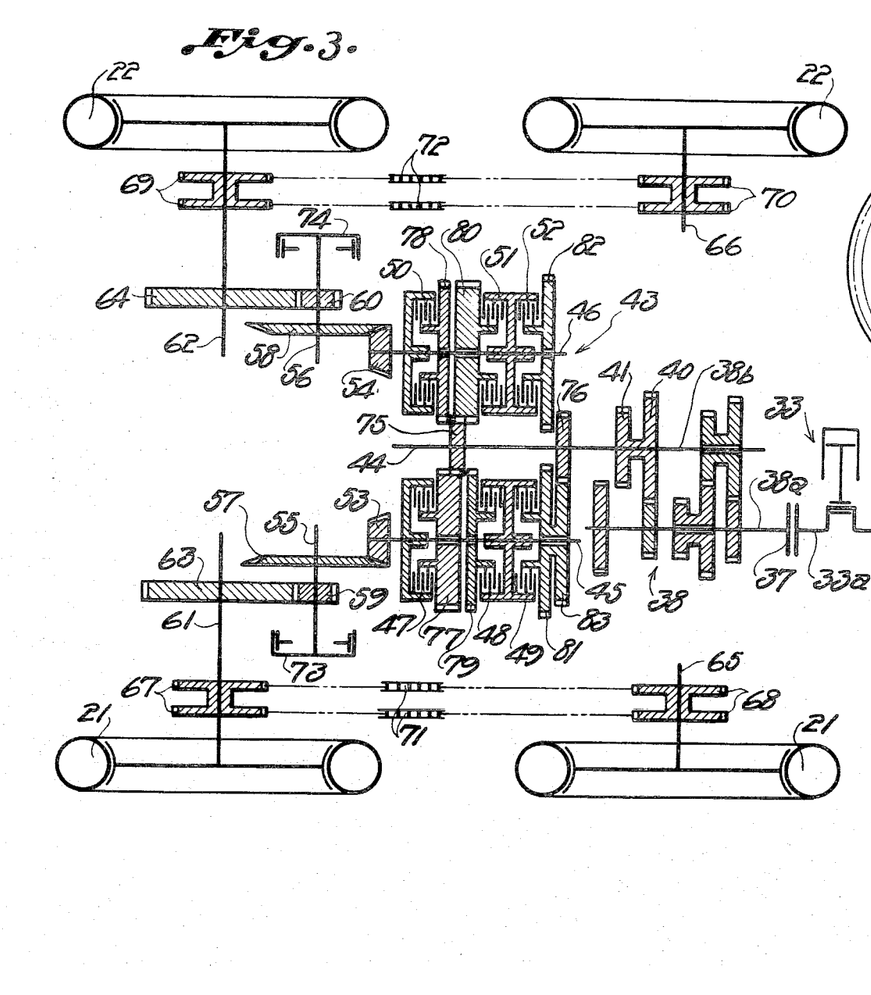
FIG. 3 is a schematic developed view of drive system for the tractor shown in FIG. 1.

The frame structure 20 supports therein an engine 33 shown in FIG. 2 adjacent the rear end of the structure. In the frame structure 20 are arranged housings 34 and 35 which extend forwardly to the engine 33. FIG. 3 shows schematically a drive or transmission system arranged in these housings.

As shown in FIG. 3, output shaft 33a of the engine 33 is connected to input shaft 38a of speed change gearing 38 through a clutch 37 which is operated by a manually operated handling means not shown in the drawings. The speed change gearing 38 has a conventional construction including combined shiftable gears 40 and 41 which are moved on and along output shaft 38b of the gearing by a manually operated shifting lever 42 shown in FIG. 1 and thus three-stage changes in speed may be obtained in the gearing 38. The clutch 37 and the gearing 38 are arranged in the housing 34. In the housing 35 is arranged transmission unit 43 having a drive shaft 44 connected to the output shaft 38b of the gearing 38 and a pair of parallel lay shaft 45 and 46 which are parallel to the drive shaft 44 and are spaced from each other and the shaft 44. On each of the lay shafts 45 and 46 are arranged three fluid actuated clutches 47, 48, 49 and 50, 51, 52 respectively which connect the lay shafts to the drive shaft selectively, as detailed later. On the front ends of respective lay shafts 45 and 46 are fixedly mounted bevel gears 53 and 54 which are in constant mesh with bevel gears 57 and 58 fixedly mounted on rotatably supported shafts 55 and 56 respectively. Said shafts 55 and 56 are in turn connected to shafts 61 and 62 for respective front wheels through speed-reducing gearing 59, 63 and 60, 64 respectively. The shafts 61 and 62 are connected to shafts 65 and 66 for respective rear wheels through chains 71 and 72 entrained over sprocket wheels 67 and 68 on the shafts 61, 62 and sprocket wheels 69 and 70 on the shafts 65, 66 respectively so that the left front and rear wheels and the right front and rear wheels are driven to rotate synchronously with same speed respectively. Further, the shafts 55 and 56 are provided with brakes 73 and 74 which brake the wheels 21 and 22 respectively. In the drive or transmission system shown, the speed change gearing 38 may be substituted by a torque converter and forced driving of both of front and rear wheels may be changed into forced driving of front or rear wheels.

Figures 4, 5, 6:
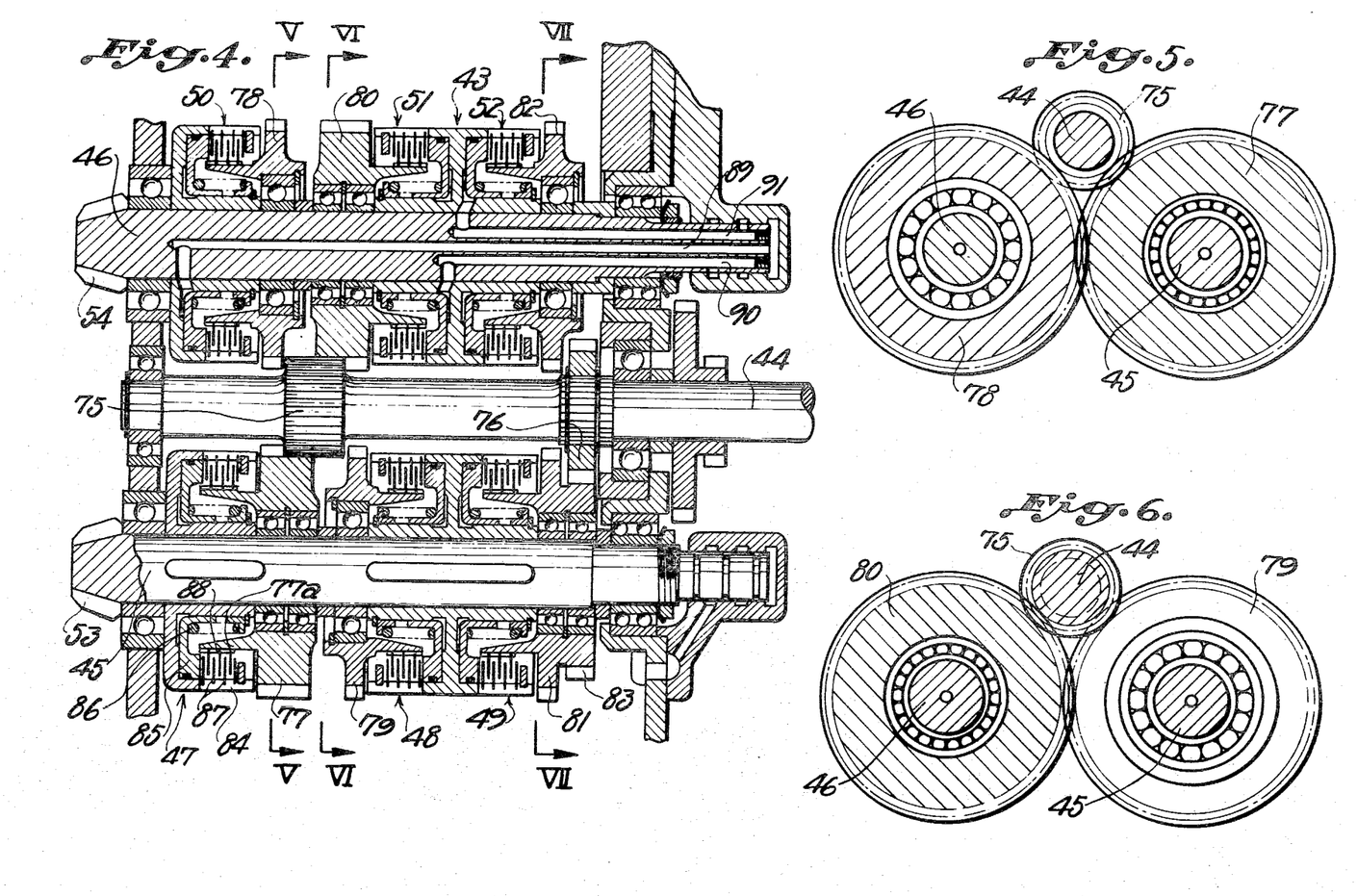
FIG. 4 is a developed sectional view of transmission unit shown in FIG. 3.
FIG. 5 is a sectional view of transmission taken along line V—V of FIG. 4.
FIG. 6 is a sectional view of transmission taken along line VI—VI of FIG. 4.

Turning now to a consideration of the transmission unit 43, the drive shaft 44 fixedly mounts a gear 75 and another gear 76 having a large diameter than the gear 75, and the lay shaft 45 and 46 rotatably mount respectively first gears 77 and 78 (hereinafter referred as first forward direction gears), second gears 79 and 80 (hereinafter referred as backward direction gears) and third gears 81 and 82 (hereinafter referred as second forward direction gears), as best shown in FIG. 4. As shown in FIG. 5, the first forward direction gear 77 on the left lay shaft 45 is in constant mesh with the gear 75 on the drive shaft 44 and the first forward direction gear 78 on the right lay shaft 46. Further, as shown in FIG. 6, the backward direction gear 80 on the right lay shaft 46 is in constant mesh with the gear 75 on the drive shaft 44 and the backward direction gear 79 on the left lay shaft 45. Furthermore, the second forward direction gear 81 on the left lay shaft 45 is combined in one body with a gear 83 having a smaller diameter which is in constant mesh with the larger gear 76 on the drive shaft 44 and, as shown in FIG. 7, the gear 81 is in constant mesh with the second forward direction gear 82 on the right lay shaft 46. The aforestated clutches are constructed so that the first clutches 47 and 50 connect the first forward direction gears 77 and 78 associated with them to the lay shafts 45 and 46 respectively when actuated, the second clutches 48 and 51 connect the backward direction gears 79 and 80 associated with them to the lay shafts 45 and 46 respectively when actuated, and the third clutches 49 and 52 connect the second forward direction gears 81 and 82 associated with them to the lay shafts 45 and 46 respectively when actuated. Consequently, the left and right lay shafts 45 and 46 are rotated in opposite directions when the first or second forward direction gear 77 or 81 is connected to the left lay shaft 45 by the first or third clutch 47 or 49 and the first or second forward direction gear 78 or 82 is connected to the right lay shaft 46 by the first or third clutch 50 or 52 or when the backward direction gear 79 is connected to the left lay shaft 45 by the second clutch 48 and the backward direction gear 80 is connected to the right lay shaft 46 by the second clutch 51. However, as shown in FIG. 3, the bevel gears 53 and 57 and the bevel gears 54 and 58 are meshed respectively so that the left and right lay shafts 45 and 46 drive to rotate the shafts 55 and 56 in opposite directions. Each of the left and right wheels 21 and 22 is, therefore, driven to rotate forwardly when one of the forward direction gears is connected to the lay shaft associated with it and to rotate backwardly when the backward direction gear on said lay shaft is connected to the lay shaft. Obviously, the wheels 21 and 22 are driven to rotate with a low speed respectively when respective first forward direction gears 77 and 78 are connected to the respective lay shafts and to rotate with a high speed respectively when respective second forward direction gears 81 and 82 are connected to the respective lay shafts.

Each of the fluid actuated clutches is of the conventional multiple-disc friction type and is operable by pressure fluid. A brief description will be given with respect to one of the clutches, namely clutch 47 associated with the gear 77, it being understood that the other clutches are of similar construction. As shown in FIG. 4, said clutch 47 comprises a cylinder 84 fixedly mounted on the lay shaft 45, a piston 85 slidably inserted into the cylinder 84 in a fluid-tight manner and biased to a clutch-disengaging position by a spring 86, friction elements 87 slidably but not rotatably supported by the cylinder 84, and other friction elements 88 slidably but not rotatably supported by hub portion 77a of the gear 77 extending from said gear into the cylinder. When pressure fluid is supplied into the cylinder 84 at the left of the piston 85, said piston is moved toward the right against the force of the spring 86 to cause frictional engagement between the elements 87 and 88 so that the clutch 47 is engaged or actuated resulting in connection of the gear 77 to the lay shaft 45. Pressure fluid for actuating each of the clutches 47 to 52 is supplied through fluid passages 89, 90, 91 and the like perforated through the lay shafts 45 and 46, as shown in FIG. 4.

Figure 8:
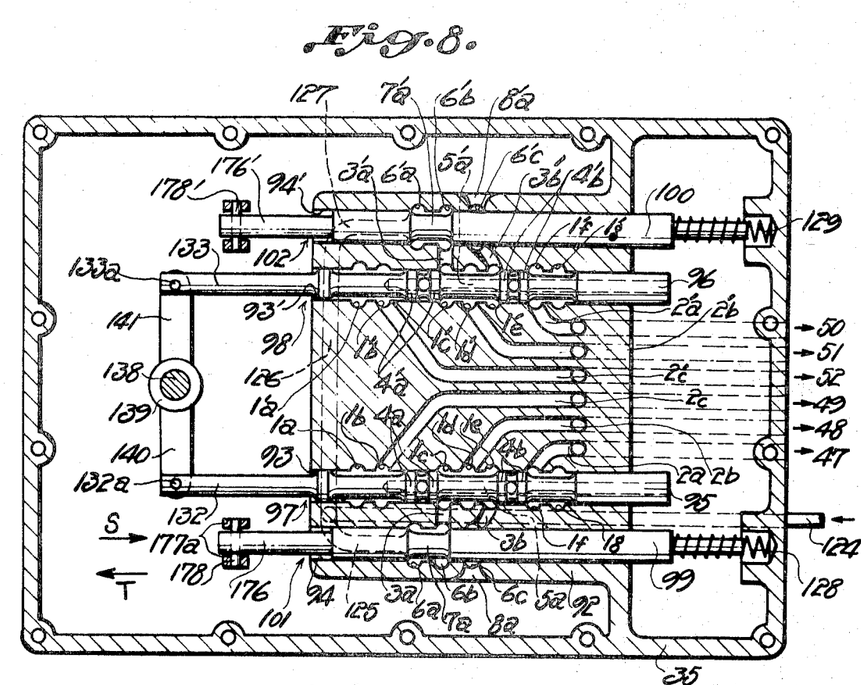
FIG. 8 is a horizontal sectional view of a part of the tractor shown in FIG. 1 showing control and change-over valve mechanism.
Figure 9A:
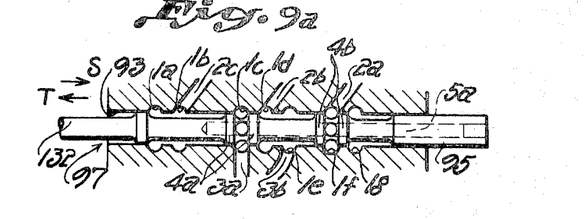
FIGS. 9a to 9c are views illustrating operations of one of control valves shown in FIG. 8.
Figure 9B:
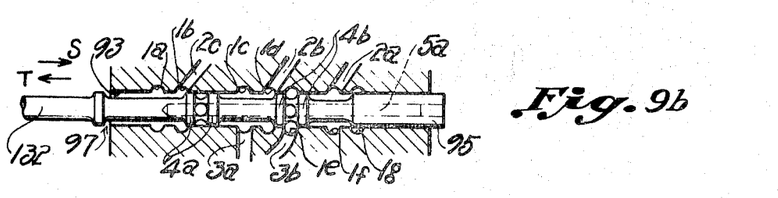
Figure 9C:
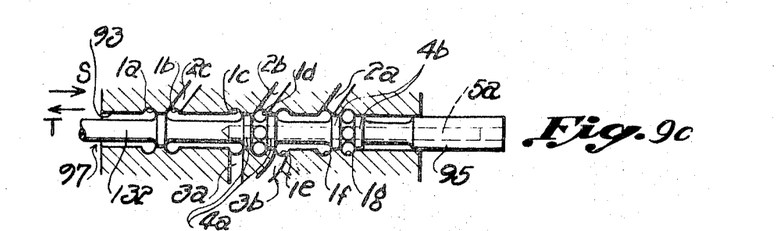

Turning now to a consideration of control valve means shown in FIGS. 8 and 9 which control supply of pressure fluid to each of said fluid actuated clutches. As shown in FIG. 8, there is arranged in the housing 35 an inner wall portion 92 through which two pairs of receiving bores 93, 93' and 94, 94' are perforated which are in parallel and spaced from one another. In each of one pair of the receiving bores 93 and 93' are slidably inserted left and right control spools 95 and 96 respectively so that left and right control valves 97 and 98 are formed. Further, in each of the other pair of the receiving bores 94 and 94' are slidably inserted left and right change-over spools 99 and 100 so that left and right change-over valves 101 and 102 are formed.

Inner circumferences of the receiving bores 93 and 93' are provided respectively from the front toward the back spaced annular grooves 1a and 1a', 1b and 1b', 1c and 1c', 1d and 1d', 1e and 1e', 1f and 1f', and 1g and 1g', as shown in FIG. 8. The annular grooves 1f and 1f' are connected respectively with fluid paths 2a and 2a' which are communicated respectively to the first clutches 47 and 50, the annular grooves 1d and 1d' are connected respectively with fluid paths 2b and 2b' which are communicated respectively to the second clutches 48 and 51, and the annular grooves 1b and 1b' are connected respectively with fluid paths 2c and 2c' which are communicated respectively to the third clutches 49 and 52. In this embodiment, said fluid paths 2a to 2c and 2a' to 2c' are formed through the inner wall portion 92 so that the paths are communicated to fluid paths formed through cover of the housing 35 (both not shown) and then are communicated to the respective fluid actuated clutches through said fluid passages 89, 90, 91 and the like. In the inner wall portion 92 are further formed fluid inlet passages 3a and 3a' for supplying pressure fluid respectively to the control valves 97 and 98 and also fluid outlet passages 3b and 3b' for draining fluid respectively from the control valves 97 and 98. The spools 95 and 96 of the control valves 97 and 98 have two pairs of spaced enlarged portions 4a, 4b and 4a', 4b' respectively which are received by the inner circumferences of the receiving bores 93 and 93' in a fluid-tight manner. Each of said spools 95 and 96 further has a fluid passage 5a or 5a' which is opened between one pair of the enlarged portions 4a or 4a' at one end and between the other pair of the enlarged portions 4b or 4b' at the other end.

Inner circumferences of the receiving bores 94 and 94' are provided respectively from the front toward the back spaced annular grooves 6a and 6a', 6b and 6b', and 6c and 6c', as shown in FIG. 8. Each of the spools 99 and 100 of the change-over valves 101 and 102 has a reduced portion 7a 7a'. Each of the aforestated fluid inlet passages 3a and 3a' is arranged between the annular grooves 1c and 6b or between the annular grooves 1c' and 6b', and each of the aforestated fluid outlet passages 3b and 3b' is arranged between the annular grooves 1e and 6c or between the annular grooves 1e' and 6c'. In the inner wall portion 92 are further formed fluid drainages 8a and 8a' which are connected to the annular grooves 6c and 6c' respectively and are communicated to a fluid tank 130 shown in FIG. 10.

Figure 10:
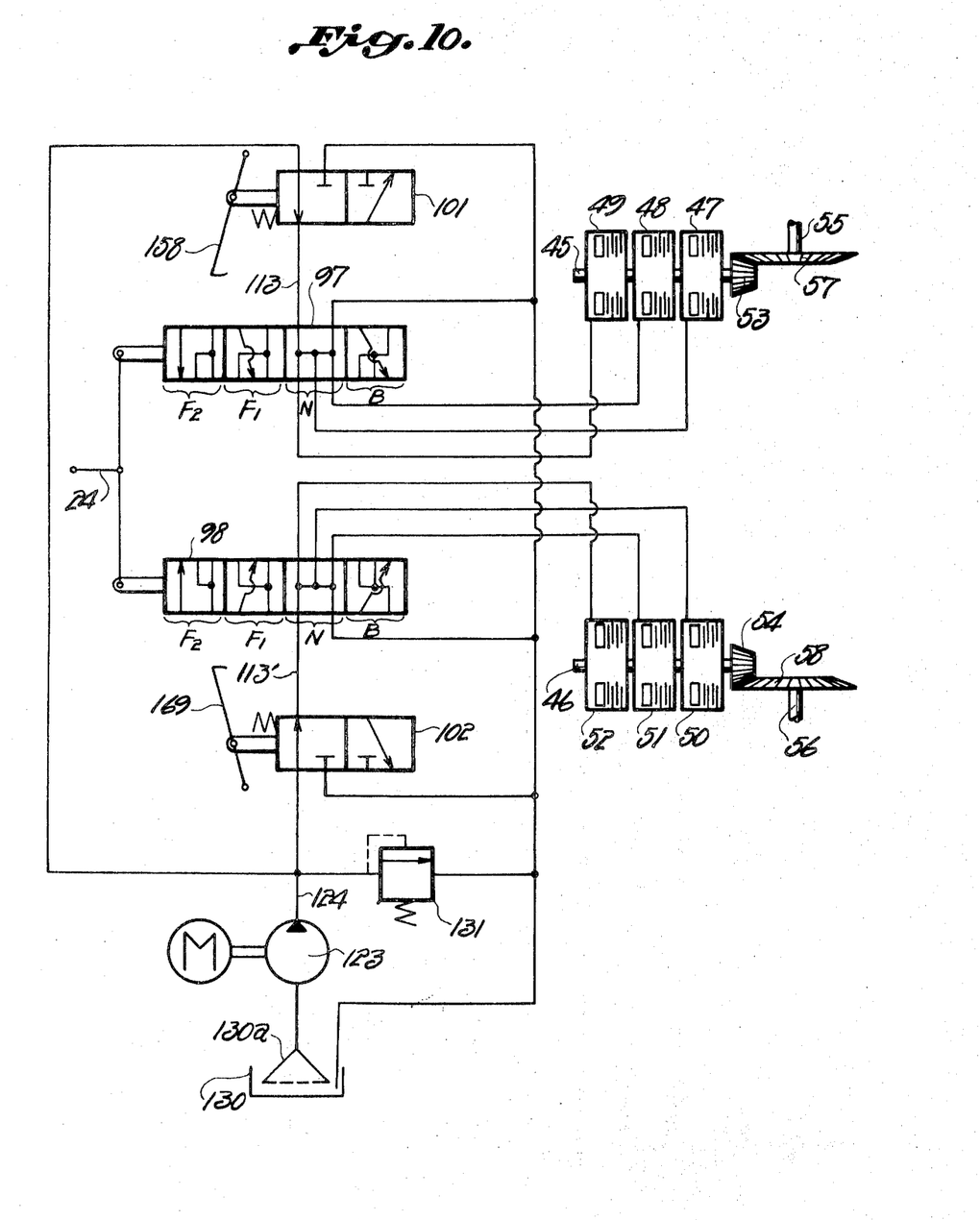
FIG. 10 is a schematic illustration of fluid circuit for maneuvering the tractor shown in FIG. 1.

Fluid supply pipe 124 in the housing 35 is connected to a pump 123 shown in FIG. 10. Said supply pipe 124 is in turn communicated to said annular grooves 6a and 6a' respectively through a line or passage 125 and through lines or passages 126 and 127.

The spools 95 and 96 of the control valves 97 and 98 are operated to slide along the longitudinal direction thereof respectively by said single maneuvering lever 24, as detailed later. The spools 99 and 100 of the change-over valves 101 and 102 are operated to slide along longitudinal direction thereof by operating the brakes 73 and 74 respectively, as also detailed later. The latter spools 99 and 100 are normally kept by springs 128 and 129 at normal positions shown in FIG. 8, respectively. Thus, pressure fluid supplied in the housing 35 by the pump 123 from the tank 130 through the pipe 124 flows into the inlet passages 3a and 3a' for the control valves 97 and 98. Flow of said supplied fluid is controlled by the control valves 97 and 98, as follows:

As shown in FIG. 10, each of the control valves 97 and 98 has a neutral position N, a first forward direction position $F_1$, a backward direction position B and a second direction position $F_2$ in correspondence with positions of the spools 95 and 96. FIGS. 8 and 10 show a state in which each of the spools 95 and 96 is positioned at a first position where each of the control valves is in the neutral position thereof. In this first position of each spool 95, 96, the annular grooves 1c and 1c' are communicated respectively to the annular grooves 1e and 1e' through clearances around the spools 95 and 96, as shown in FIG. 8, so that pressure fluid from the inlet passages 3a and 3a' is drained into the tank 130 through the outlet passages 3b and 3b', the annular grooves 6c and 6c' of the change-over valves 101 and 102, and the fluid drainages 8a and 8a' whereby pressure fluid is not supplied to any of the fluid actuated clutches.

FIG. 9a shows a state in which the spool 95 of the control valve 97 is positioned by pushing said spool 95 to slide in the direction of arrow S at a second position where the control valve 97 is in said first forward direction position. In this second position of the spool 95, one pair of the enlarged portions 4a bridges the annular groove 1c and the other pair of the enlarged portions 4b bridges the annular groove 1f so that the former groove 1c is communicated to the latter groove 1f through the fluid passage 5a. Pressure fluid from the inlet passage 3a flows, therefore, into the first clutch 47 through the groove 1c, passage 5a, groove 1f and the fluid path 2a so that said left first clutch 47 is actuated. Similarly, the spool 96 of the control valve 98 has a second position where the control valve 98 is in said first forward direction position thereof and, in this second position of the spool 96, the right first clutch 50 is actuated in a similar manner.

FIG. 9b shows a state in which the spool 95 of the control valve 97 is positioned by pulling said spool 95 to slide in the direction of arrow T at a third position where the control valve 97 is in said backward direction position. In this third position of the spool 95, paired enlarged positions 4b bridge the annular groove 1e to close the outlet passage 3b, and the annular groove 1c is communicated to the annular groove 1d through clearance around the spool 95 so that pressure fluid from the inlet passage 3a flows into the fluid path 2b and then into the left second clutch 48, whereby said clutch 48 is actuated. Similarly, the spool 96 of the control valve 98 has a third position where the control valve 98 is in said backward direction position thereof and, in this third position of the spool 96, the right second clutch 51 is actuated in a similar manner.

FIG. 9c shows a state in which the spool 95 of the control valve 97 is positioned by pushing said spool 95 from said second position thereof to slide further in the direction of arrow S at a fourth position where the control valve 97 is in said second forward direction position. In this fourth position of the spool 95, one pair of the enlarged portions 4a bridge the annular groove 1d and the other pair of the enlarged portions 4b bridge the annular groove 1g so that the outlet passage 3b is closed. The annular groove 1c is communicated to the annular groove 1b through clearance around the spool 95 so that pressure fluid from the outlet passage 3a flows into the fluid path 2c and then into the left third clutch 49, whereby said clutch 49 is actuated. Similarly, the spool 96 of the control valve 98 has a fourth position where the control valve 98 is in said second forward direction position thereof and, in this fourth position of the spool 96, the right third clutch 52 is actuated in a similar manner.

The fluid tank 130 shown in FIG. 10 is formed with the lower portion of the housing 35. The pump 123 also shown in FIG. 10 is provided in the housing 34. Further, the fluid circuit shown in FIG. 10 has a safety valve 131 and a filter 130a arranged in the tank 130. The operation of the change-over valves 101 and 102 will be detailed later.

Turning now to a consideration of FIGS. 11 to 15, there is shown a handling or operating mechanism in said figures by which the control valves 97 and 98 are operated so as to control the flow of pressure fluid to the fluid actuated clutches 47 to 52. As stated before, the control valves 97 and 98 are operated by handling the single maneuvering lever 24. As shown in FIG. 8 and FIGS. 11 to 13, operating rods 132 and 133 are connected to the spools 95 and 96 of the control valves 97 and 98 at the front ends of said spools respectively, and said operating rods 132 and 133 are extended into a housing 134. In the housing 134 is fixedly provided a horizontal guide rod 135 extending along the longitudinal direction of each spool 95, 96. On said guide rod 135 is slidably mounted a shifter 136 having a groove 136a on the upper face at a forward portion thereof which groove extends across the guide rod 135. The lower end of said single maneuvering lever 24 is received by the groove 136a of the shifter 136. The shifter 136 rotatably mounts on the upper face thereof a plate member 137 from which a vertical shaft 138 rotatably received by the shifter 136 is projected downwardly. The rotatable plate member 137 has a fork 137a which receives the lower portion 24a of the lever 24. To the lower end of the shaft 138 is secured a disc-like member 139 from which a pair of arms or fork members 140 and 141 are projected at both sides. The arms 140 and 141 are engaged to the operating rods 132 and 133 by means of forks at the ends of the arms and pins 132a and 133a on the rods, respectively. The lower portion 24a of the maneuvering lever 24 extends through a ball 143 which is supported by a pin 142 fixedly secured to the housing 134 and is received by a spherical bearing 144 provided to the upper end of the housing 134.

Figures 11, 12:
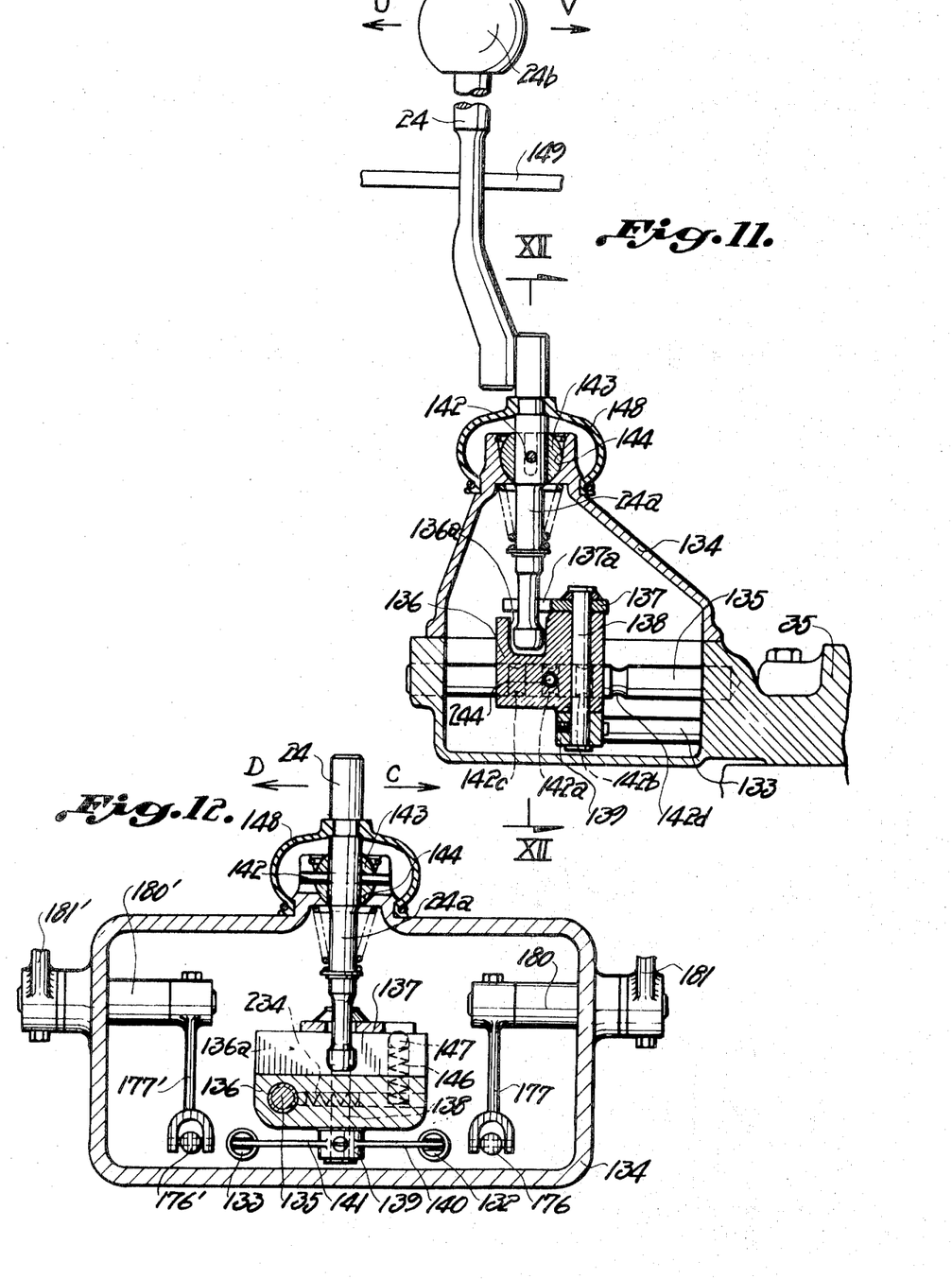
FIG. 11 is a vertical sectional view, partially cut away, of a part of the tractor shown in FIG. 1 showing handling mechanism for the control valves shown in FIG. 8.
FIG. 12 is a vertical sectional view, partially cut away, taken along line XII—XII of FIG. 11.

Consequently, when the maneuvering lever 24 is displaced by the operator by moving a knob 24b at the top of the lever in a forward direction along an arrow U shown in FIG. 11, the shifter 136 is moved backwardly along the guide rod 135 to cause backward movement of the shaft 138 so that both of the spools 95 and 96 are pushed backwardly at a time through the arms 140, 141 and the operating rods 132, 133, whereby both of the spools 95 and 96 are displaced from the first positions shown to said second positions and then to said fourth positions. Thus, by operating the single maneuvering lever 24, left and right first clutches 47 and 50 may be actuated or engaged at a time and then left and right third clutches 49 and 52 may be actuated or engaged at a time, so that the tractor may be advanced with a first or low speed or with a second or high speed by driving the left and right wheels 21 and 22 to rotate forwardly at a time.

Conversely, when the tractor is desired to be retreated, the maneuvering lever 24 is displaced by a manual operation backwardly along the arrow V shown in FIG. 11 to cause forward movement of the shifter 136 along the guide rod 135 resulting in forward movement of the shaft 138, so that both of the spools 95 and 96 are pulled forwardly at a time through the arms 140, 141 and the rods 132, 133 whereby the spools 95 and 96 are displaced from the first positions shown to said third positions thereof. Thus, by operating the single maneuvering lever 24, left and right second clutches 48 and 51 may be actuated or engaged at a time so that the tractor may be retreated with a low speed by driving the left and right wheels 21 and 22 to rotate backwardly at a time.

Figure 19A:
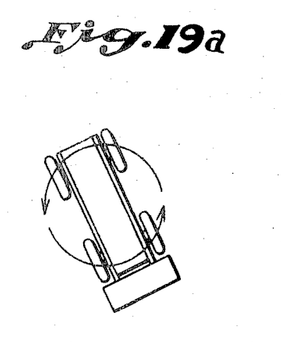
FIGS. 19a to 19c are schematic illustrations of the tractor shown in FIG. 1 in each of several turning movements afforded by the present invention.

As stated above, both of the left and right wheels of the tractor may selectively be rotated forwardly or backwardly by manually operating the single maneuvering lever 24. Further, by manually operating said single maneuvering lever 24, the left and right wheels of the tractor may be rotated in opposite directions, as will be explained with reference to FIG. 14. When the maneuvering lever 24 is displaced from a state shown in FIG. 14a toward arrow C shown in FIG. 12 by a manual operation, the plate member 137 is rotated around the shaft 138 due to the engagement of the fork 137a of the member 137 with the lower portion 24a of the lever 24 so that the disc-like member 139 and the arms 140, 141 are rotated through the shaft 138 resulting in a state shown in FIG. 14b. In this state, the spool 95 is pulled through the rod 132 from the first position thereof to the third position thereof to cause actuation of the left second clutch 48 and the spool 96 is pushed through the rod 133 from the first position thereof to the second position thereof to cause actuation of the right first clutch 50. Thus, the left wheels 21 are driven to rotate backwardly with a low speed and the right wheels 22 are driven to rotate forwardly with a low speed. When the left and right wheels are thus rotated in opposite directions, the tractor is turned about its center or makes a so-called spin-turn, as shown in FIG. 19a. Conversely, when the maneuvering lever 24 is displaced along arrow D shown in FIG. 12, the plate member 137 and the arms 140, 141 are rotated to a position shown in FIG. 14c so that the spool 95 is displaced to the second position thereof and the spool 96 is displaced to the third position thereof whereby the left first clutch 47 and the right second clutch 51 are engaged. Thus, the left wheels 21 are driven to rotate forwardly and the right wheels 22 are driven to rotate backwardly so that the tractor makes a right spin-turn.

Figures 13, 14A:
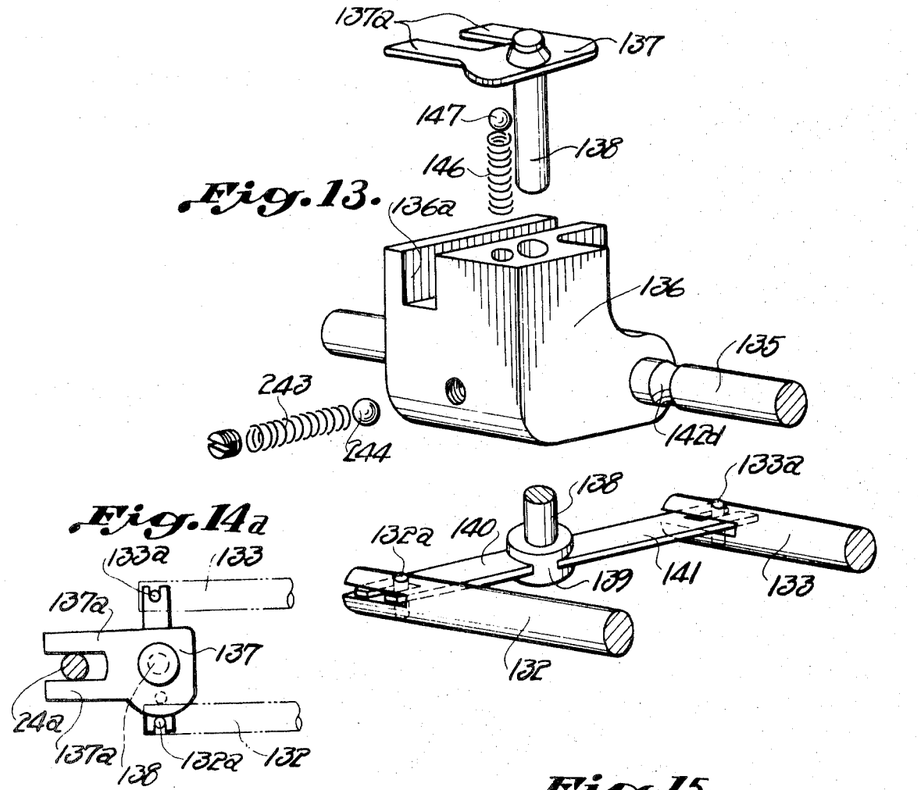
FIG. 13 is a decomposed perspective view of a part of the handling mechanism shown in FIG. 11.
FIGS. 14a to 14c are views illustrating operations of the handling mechanism shown in FIG. 11.
Figure 14B:
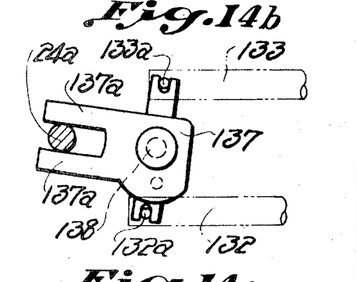
Figure 14C:
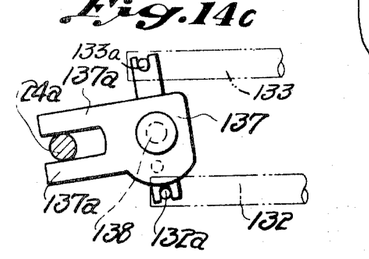

The guide rod 135 is formed with four annular grooves 142a, 142b, 142c and 142d by which a ball 244 provided in the shifter 136 and forced by a spring 243 is received for restraining temporarily sliding movement of the shifter 136 at each required position of said shifter. Further, the rotatable plate member 137 is formed at the lower face thereof with three semispherical concaves (not shown in the drawings) by which a ball 147 provided in the shifter 136 and forced by a spring 146 is received for restraining temporarily rotatable movement of the plate member 137 at each required position of said member. The housing 134 is provided with a cover 148 of rubber.

Figure 15:
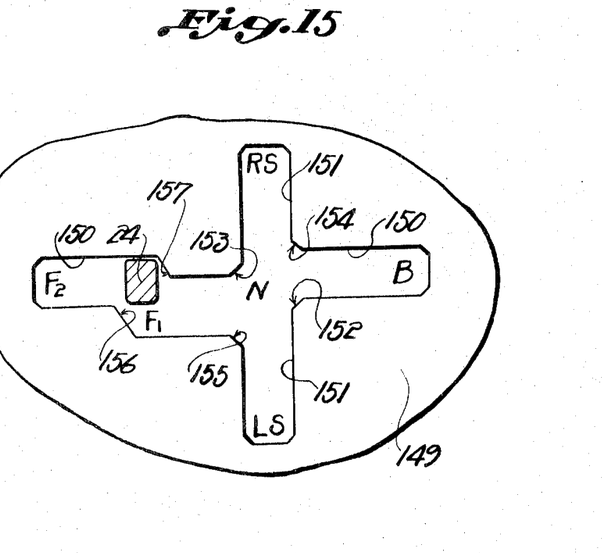
FIG. 15 is a plane view of a part of manipulation guide for maneuvering lever provided to the handling mechanism shown in FIG. 11.

Now, a lever guide 149 for the single maneuvering lever 24 is explained. The upper portion of the maneuvering lever 24 extends through said lever guide 149, as shown in FIG. 11. As shown in FIG. 15, the guide 149 is provided with a first guide groove 150 extending along longitudinal direction of the tractor and a second guide groove 151 extending along transverse direction of the tractor and crossing said first guide groove 150. The maneuvering lever 24 is inserted in said guide grooves 150 and 151 so that the lever 24 may be displaced to a neutral position N at the crossing of the grooves 150 and 151, a first forward direction position $F_1$ in the first groove 150 at a forward side of said crossing, a backward direction position B in the first groove 150 at a rearward side of said crossing, and a second forward direction position $F_2$ in the first groove 150 at a further forward side of said crossing. Said positions N, $F_1$, B and $F_2$ are determined so that both of the spools 95 and 96 are positioned in said first, second, third and fourth positions when the lever 24 is displaced to said neutral, first forward direction, backward direction and second forward direction positions N, $F_1$, B, and $F_2$, respectively. Further, the maneuvering lever 24 may be displaced to a left spin-turn position LS in the second guide groove 151 at the left side of the crossing of the grooves 150 and 151 so as to displace the rotatable plate member 137 from the state shown in FIG. 14a to the state shown in FIG. 14b and a right spin-turn position RS in the second guide groove 151 at the right side of the crossing of the grooves 150 and 151 so as to displace the rotatable plate member 137 from the state shown in FIG. 14a to the state shown in FIG. 14c. The inner face of the crossing of the guide grooves 150 and 151 is provided with a step 152 with which, when the maneuvering lever 24 is returned from the first direction position $F_1$ to the neutral position N, said lever 24 is engaged whereby unexpected further displacement of the lever 24 toward the backward direction position B being prevented. The inner face of the crossing of the guide grooves 150 and 151 is further provided with steps 153, 154 and 155 with which, when the maneuvering lever 24 is returned respectively from the backward direction, left spin-turn and right spin-turn positions B, LS and RS to the neutral position N, said lever 24 is engaged whereby unexpected further displacements of the lever 24 toward the first direction, right spin-turn and left spin-turn positions $F_1$, RS and LS being prevented, respectively. Furthermore, inner face of the first guide groove 150 is provided at the boundary between said first and second direction positions $F_1$ and $F_2$ with two steps 156 and 157. When the maneuvering lever 24 is displaced from the neutral position N to the first direction position $F_1$ or from the second forward direction position $F_2$ to the first direction position $F_1$, the lever 24 is engaged with the step 156 or 157 so that unexpected further displacement of the lever toward the second forward direction position $F_2$ or toward the neutral position N is well prevented. Thus, the tractor may be spin-turned during a forward or backward travel only after the tractor has once been stopped with certainty because the maneuvering lever 24 is necessarily returned to the neutral position N before the lever 24 is displaced from the first forward direction position $F_1$ or the backward direction position B to the left or right spin-turn position LS or RS, so that shock and the like, which would be caused if a tractor is spin-turned suddenly during a forward or backward travel, are well avoided. Further, shock and the like, which would be caused if, for example, the direction of travel of a tractor is suddenly changed, are well avoided, because the maneuvering lever 24 is once restrained at the neutral position N and at the boundary between the first and second forward direction positions $F_1$ and $F_2$.

Figure 16:
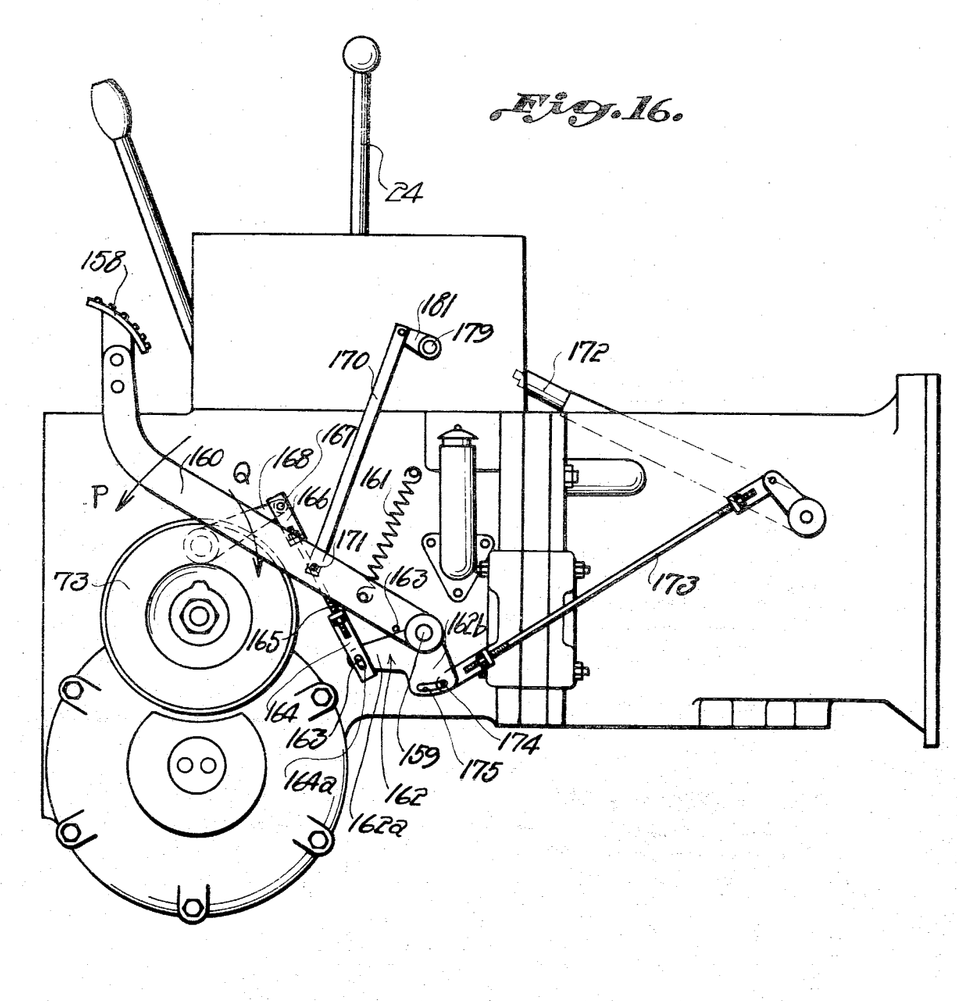
FIG. 16 is a side view of handling mechanism for brake for left wheels of the tractor shown in FIG. 1.

Turning now to a consideration of FIG. 16, there is shown operating or actuating mechanism for the aforestated brake 73. Said brake 73 is actuated by operating a pedal 158 which is provided in front of the operator's seat 23 as shown in FIG. 1. The pedal 158 is secured to the top of an elongated lever 160 which is pivotally mounted at the lower end thereof on a shaft 159 and is biased by a spring 161 to a position shown in FIG. 16 in which the brake 73 is unactuated. The shaft 159 pivotally mounts further a plate member 162 in the form of upside-down L-letter. One leg 162a of said plate member 162 is engaged with a projection 163 provided to the lever 160 at adjacent lower end of said lever. A plate 164 is provided which has an elongated aperture 164a in which a pin 163 projected from the leg 162a of the plate member 162 is inserted. Said plate 164 is connected through a rod 165 to a further plate 166 which is pivotally connected by a pin 167 to a lever 168 for operating or actuating the brake 73. Consequently, when operator operates the pedal 158 with his left foot, the lever 160 is revolved round the shaft 159 in a direction shown with arrow P so that the plate member 162 is rotated in said direction. After the pin 163 has been displaced in and along the aperture 164a from the top to the bottom of said aperture by the rotation of the plate member 162, a further rotation of said plate member 162 causes downward pulling of the plate 164 by the pin 163 so that the lever 168 is revolved through the rod 165 and the plate 166 in a direction shown with arrow Q whereby the brake 73 being actuated to brake the left wheel 21. Said brake 73, may, of course, be actuated, by selectively changing the degree of pushing-down of the pedal 158 by the left foot of operator, so that the left wheels 21 are so-called half-braked under an optional braking force. The other brake 74 is actuated by a pedal 169 shown in FIG. 1 through a similar mechanism.

The tractor shown is constructed so that said change-over valves 101 and 102 are operated with the operation of brakes. For the purpose of such operation, a lever 170 is provided which is pivotally connected at the lower end thereof to said lever 160 by a pin 171 as shown in FIG. 16. Consequently, when the pedal 158 is manually operated, the lever 170 is pulled downwardly to cause operation of the left change-over valve 101 through a mechanism detailed later. The left brake 73 is actuated first after the left change-over valve 101 has been operated because a loose connection comprising the elongated aperture 164a of the plate 164 and the pin 163 on the plate member 162 is provided in the connection between the pedal 158 and the operating lever 168 for the purpose of delaying actuation of operation of the brake 73. This is also true in the operating mechanism for the right brake and change-over valve.

For braking the left and right wheels before parking the tractor, separate operating mechanism for actuating the brakes 73 and 74 is provided. A manually operable means 172 for such purpose is operatively connected to a rod 173, as shown in FIG. 16. Said rod 173 is connected at one end thereof to a leg 162b of the plate member 162 by inserting a pin 174 on the rod 173 in an elongated aperture 175 provided to the leg 162b. The brake 73 may, therefore, also be actuated by manually handling the means 172. In operating the brake 73 by the pedal 158, the revolution of the plate member 162 is not transmitted to the rod 173 due to a loose connection comprising the aperture 175 of the member 162 and the pin 174 on the rod 173 so that the means 172 is not operated or displaced by the operation of the pedal 158. The other brake 74 may also be actuated by said manually operable means 172 through a similar mechanism.

Figure 17:
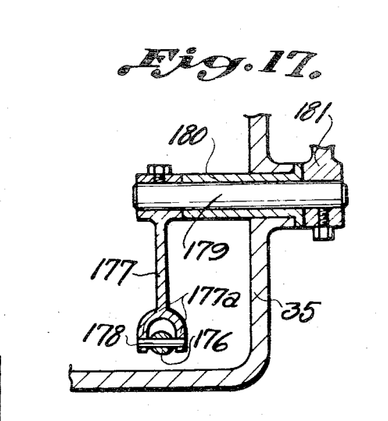
FIG. 17 is a vertical sectional view of a part of the tractor shown in FIG. 1 showing handling mechanism for one of change-over valves shown in FIG. 8.

Turning to a consideration of a mechanism for operating the change-over valves 101 and 102, a push rod 176 shown in FIGS. 8 and 17 is connected in one body to the front end of the spool 99 of the change-over valve 101. As shown in FIG. 17, a rotatable plate member 177 having a fork 177a at one end is provided which is operatively connected to said push rod 176 by a pin 178 secured to the fork 177a. The other end of the rotatable plate member 177 is secured to a shaft 179 which is rotatably supported by the housing 35 through a sleeve 180 and is projected outwardly from the housing 35. Outside the housing 35, said shaft 179 is operatively connected to said lever 170 through a crank 181.

Figure 18A:
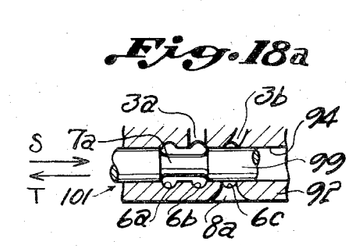
FIGS. 18a and 18b are views illustrating operations of one of the change-over valves shown in FIG. 8.
Figure 18B:
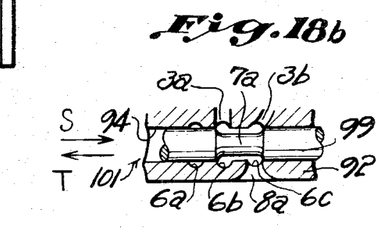

When the pedal 158 is manually operated, the shaft 179 is rotated through the levers 160 and 170 and the crank 181 to cause rotation or revolution of the plate member 177 so that the push rod 176 is pushed forwardly in a direction shown with arrow S in FIGS. 8 and 18. The spool 99 is, therefore, pushed in said direction by the push rod 176 from the aforestated normal position shown in FIG. 8 and FIG. 18a to an operated position shown in FIG. 18b in which the line 125 is shut by the spool 99 and the annular groove 6b is communicated to the annular groove 6c through clearance around the reduced portion 7a of the spool 99. As clearly seen from FIG. 18b and also from the fluid circuit shown in FIG. 10, the inlet passage 3a and the outlet passage 3b for the control valve 97 are communicated to the drainage 8a so that pressure fluid from the line 125 is shut off and is tanked through the safety valve 131 and fluid in said fluid actuated clutch means is drained. Thus, in whichever position the spool 95 of the control valve 97 may be, all of the clutches 47, 48 and 49 associated with the valve 101 are disengaged.

The other change-over valve 102 is similarly operated by the other pedal 169 so that the spool 100 of said valve 102 is displaced from the normal position thereof shown in FIG. 8 to an operated position before the right brake 74 is actuated. Thus, all of the clutches 50, 51 and 52 are disengaged before the actuation of the right brake 74 in whichever position the spool 96 of the right control valve 98 may be. Like parts in the operating mechanism for the right change-over valve 102 are designated by like reference numerals but having primes.

Figure 19B:
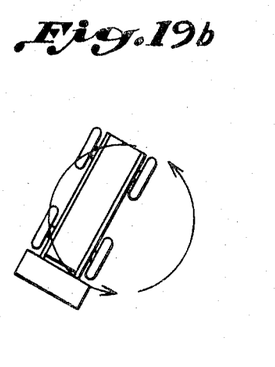
Figure 19C:
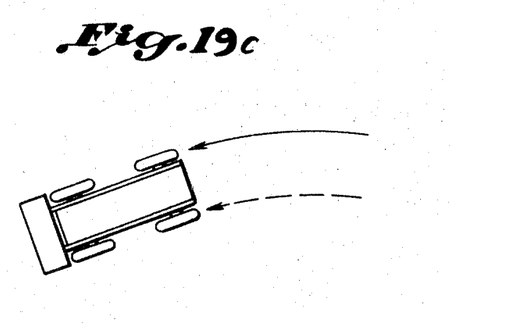

Owing to the construction of the tractor detailed hereinbefore, the tractor is stopped when the maneuvering lever 24 is positioned in the neutral position N of the lever guide 149 due to disengagements of all of the first, second and third clutches 47 to 49 and 50 to 52 for the left and right wheels 21 and 22, is advanced with a low speed when the maneuvering lever 24 is positioned in the first forward direction position $F_1$ of the lever guide 149 due to the engagements of the first clutches 47 and 50 for the left and right wheels 21 and 22, is retreated with a low speed when the maneuvering lever 24 is positioned in the backward direction position B of the lever guide 149 due to the engagements of the second clutches 48 and 51 for the left and right wheels 21 and 22, is advanced with a high speed when the maneuvering lever 24 is positioned in the second forward direction position $F_2$ due to the engagements of the third clutches 49 and 52 for the left and right wheels 21 and 22, is spin-turned toward the left when the maneuvering lever 24 is positioned in the left spin-turn position LS of the lever guide 149 due to the engagements of the second clutch 48 for the left wheels 21 and the first clutch 50 for the right wheels 22, and is spin-turned toward the right when the maneuvering lever 24 is positioned in the right spin-turn position RS of the lever guide 149 due to the engagements of the first clutch 47 for the left wheels 21 and the second clutch 51 for the right wheels 22. The tractor may further be turned in other ways. That is, when the left or right brake 73 or 74 is actuated so as to brake perfectly the left or right wheels 21 or 22 by operating the left or right pedal 158 or 169 during a forward or backward travel of the tractor, the tractor is turned about the left or right wheels 21 or 22 as shown, for example, in FIG. 19b. That is, the tractor may make so-called pivot-turn. Conversely, when the left or right wheels 21 or 22 are half-braked with an optional braking force by manually operating the left or right pedal 158 or 169 during a forward or backward travel so that the braked left or right wheels 21 or 22 may rotate somewhat freely, the tractor may be turned with an optional radius of turning in correspondence to said braking force as shown, for example, in FIG. 19c. That is, the tractor may make a power-turn with an optional radius of turning. In the tractor according to the present invention, the operator can maneuver the tractor variously as stated above with only one of his hands, namely by operating only one maneuvering lever.

Figure 20:
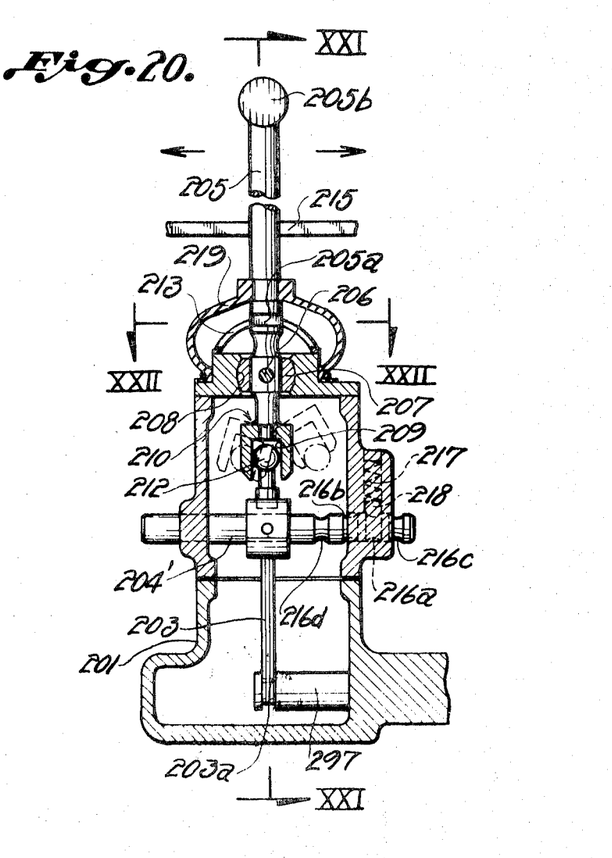
FIG. 20 is a vertical sectional view, partially cut away, similar to FIG. 11 but showing an another embodiment of handling mechanism for control valves employed in the tractor shown in FIG. 1.
Figure 21:
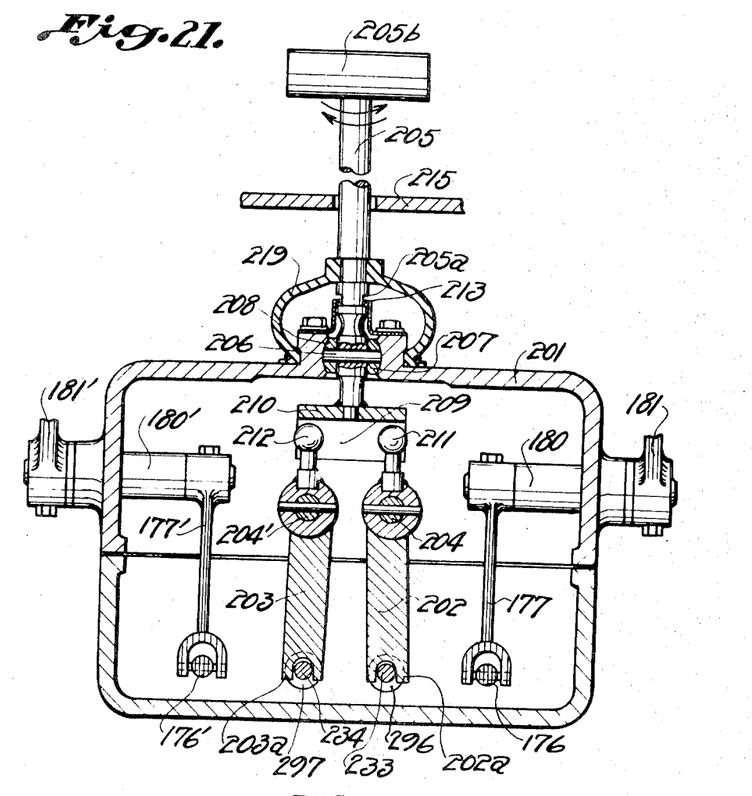
FIG. 21 is a vertical sectional view, partially cut away, taken along line XXI—XXI of FIG. 20.

Referring now to FIGS. 20 to 23, there is shown another mechanism for operating control valves for controlling supply of pressure fluid to the aforestated fluid actuated clutch means. As shown in FIGS. 20 and 21, this other mechanism comprises parallel vertical plate-like members 202 and 203 having at the lower ends thereof forks 202a and 203a by which said members 202 and 203 are engaged with control spools 296 and 297 of left and right control valves or operating rods 233 and 234 secured to said spools, respectively. The control valves may be constructed similarly to the ones described in the first embodiment detailed before but slightly changed according to the operating mechanism of this embodiment. Such changes in construction of control valves may easily be made by those skilled in the art so that no further description on said control valves will be made. The plate-like vertical members 202 and 203 are supported respectively by sliding rods 204 and 204' which extend along the longitudinal direction of parallel spools 296 and 297 and are slidably received by housing 201. A single maneuvering lever 205 is provided which is projected in the housing 201 at the lower portion thereof. A ball 207 is attached to the lever 205 by a pin 206, and the ball is received by a spherical bearing 208 provided in the top of the housing 201. A shifting device 210 is secured to the lower end of the maneuvering lever 205 and has a groove 209 extending along a direction perpendicular to said sliding rods 204, 204'. Ball-like top portions 211 and 212 of the plate-like members 202 and 203, respectively, are received by the groove 209.

Consequently, when the maneuvering lever 205 is displaced manually in forward or backward direction as shown by arrows in FIG. 20, the shifting device 210 is displaced in backward or forward direction so that the spools 296 and 297 are moved backwardly or forwardly at a time through the members 202, 203 and the rods 233, 234. Further, when the maneuvering lever 205 is turned or rotated about its center in one or another direction as shown with arrows in FIG. 21, the shifting device 210 is rotated about the lever 205 so that the plate-like members 202 and 203 are moved in opposite directions. In other words, one of the members 202 and 203 is moved in a forward direction so that one of the spools 296 and 297 is displaced forwardly and the other of the members 202 and 203 is moved in a backward direction so that the other of the spools 296 and 297 is displaced backwardly.

Figure 22:
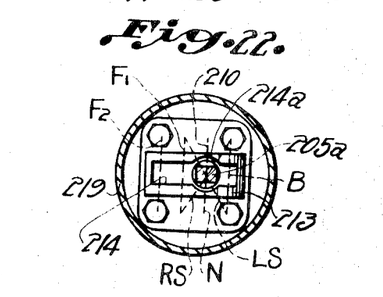
FIG. 22 is a horizontal sectional view taken along line XXII—XXII of FIG. 20.
Figure 23:
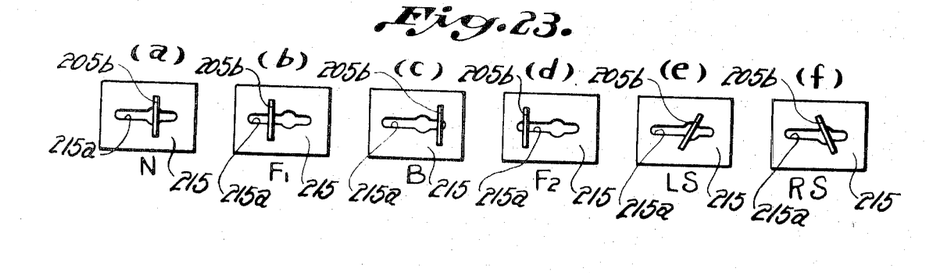
FIGS. 23a to 23f are views illustrating operations of the handling mechanism shown in FIG. 20.

The maneuvering lever 205 has a squared portion 205a which is received by a guide plate 213. As shown in FIG. 22, said guide plate 213 is provided with a guide groove 214 which extends along longitudinal direction of the tractor and has a circular portion 214a. The maneuvering lever 205 can be rotated about its center only when the squared portion 205a thereof is positioned in said circular portion 214a. Said circular portion 214a is determined as neutral position N of the maneuvering lever 205. From said neutral position N, the lever 205 may be displaced to first forward direction position $F_1$, backward direction position B and second forward direction position $F_2$ respectively by displacing the lever 205 to move in forward or backward direction and may be displaced to left spin-turn position LS and right spin-turn position RS respectively by displacing the lever 205 to rotate about its center, as shown in FIG. 22 with the positions of the shifting device 210 shown with imagined line. Of course, the spools of control valves are displaced by such displacements of the maneuvering lever 205 to required positions similarly to the ones of the aforedetailed first embodiment.

To the top of the maneuvering lever is secured a knob 205b extending in a direction across the tractor for rotating the lever with ease. Further, the upper portion of the maneuvering lever 205 extends through a lever guide 215 having a guide groove 215a similar to the groove 214 of the guide plate 213. FIGS. 23a to 23f illustrate with the positions of the knob 205b the neutral position N (FIG. 23a), first forward direction position $F_1$ (FIG. 23b), backward direction position B (FIG. 23c), second forward direction position $F_3$ (FIG. 23d), left spin-turn position LS (FIG. 23e) and right spin-turn position RS (FIG. 23f), respectively.

In the mechanism shown in FIGS. 20 to 23, the spools 296 and 297 of the control valves are restrained temporarily in each of first, second, third and fourth positions by balls 218 which are forced by springs 217 into each of annular grooves 216a, 216b, 216c and 216d formed on the sliding rods 204 and 204' as shown in FIG. 20. The housing is covered with a covering 219 of rubber.

One of the important characteristics of the tractor according to the present invention consists in the fact that the tractor may be maneuvered by a single maneuvering lever so that operator can maneuver the tractor by using only one hand. Thus, the operator can always operate or handle freely operating means for a material handling component or the like by using his other hand so that the time required for a cycle of an earth working or earth moving operation or the like including maneuvers of the tractor is reduced considerably and the efficiency of operation is greatly enhanced.

Another important characteristic of the tractor according to the present invention consists in the fact that forward direction speed of the tractor may be changed between a low speed and a high speed in a transmission unit which is operated by said single maneuvering lever so that changes in forward direction speed which are often required in a material handling operation or the like may be made by handling said single maneuvering lever. Thus, the tractor further enhances operation efficiency of an earth working operation, earth moving operation or the like.

Having now described the invention and having exemplified the manner in which it can be carried into practise, it is apparent to those skilled in the art that innumerable variations, applications, modifications and extensions of the basic principles involved may be made without departing from the spirit of the present invention. The invention is, therefore, to be limited only by the scope of the appended claims.

What is claimed is:

1. A tractor comprising
    a frame structure,
    an engine supported by said frame structure,
    final drive means carried by the frame structure at opposite sides thereof,
    brake means for each of said final drive means,
    a pair of power transmitting means for connecting said final drive means to output of the engine,
    each of said power transmitting means including a first fluid actuated clutch means for connecting said final drive means associated with the power transmitting means to the engine output so as to drive the final drive means in a forward direction and a second fluid actuated clutch means for connecting said final drive means associated with the power transmitting means to the engine output so as to drive the final drive means in a backward direction,
    a pressure fluid source,
    a pair of control valve means having in parallel spaced spools for controlling supply of pressure fluid from said fluid source to said clutch means,
    each of said spools having a neutral or first position in which said first and second clutch means associated with it are both disengaged, a second position in which said first clutch means associated with it is engaged and said second clutch means associated with it is disengaged, and a third position in which said first clutch means associated with it is disengaged and said second clutch means associated with it is engaged,
    a single maneuvering lever, and
    connecting means for connecting said spools to said single maneuvering lever so as to change positions of said spools by operating said lever,
    said connecting means including a first connecting member which is moved along with said spools by displacing said single maneuvering lever along a first direction so that both of the spools are moved in the same direction at the same time and a second connecting member which is rotated by displacing said single maneuvering lever along a second direction so that the spools are moved in opposite directions at the same time,
    said single maneuvering lever being movable to a neutral position in which said first and second connecting members are positioned so that both of the spools are in said first positions thereof, a forward direction position in which said first connecting member positions both of the spools in said second positions thereof due to displacement of said lever from said neutral position to this forward direction position along said first direction, a backward direction position in which said first connecting member positions both of the spools in said third positions thereof due to displacement of said lever from said neutral position to this backward direction position along said first direction, a left spin-turn position in which said second connecting member positions the spool associated with the left final drive means in said third position thereof and the spool associated with the right final drive means in said second position thereof due to displacement of said lever from said neutral position to the left spin-turn position along said second direction, and a right spin-turn position in which said connecting member positions the spool associated with the left final drive means in said second position thereof and the spool associated with the right final drive means in said third position therof due to displacement of said lever from said neutral position to the right spin-turn position along said second direction.

2. The tractor as claimed in claim 1 wherein said engine output includes a drive shaft and a gear fixedly mounted on the drive shaft, each of said power transmitting means including a lay shaft, a forward direction gear and a backward direction gear rotatably mounted on the lay shaft, and connecting means for constant connection of said lay shaft to the final drive means associated with the power transmitting means, the forward direction gear on one of the lay shafts being in constant mesh with the gear on the drive shaft and the forward direction gear on the other of the lay shafts, the backward direction gear on said other of the lay shafts being in constant mesh with the gear on the drive shaft and the backward direction gear on said one of the lay shafts, each of said first clutch means being associated with the forward direction gear on each of the lay shafts associated with it so that said forward direction gear is connected to the lay shaft when the first clutch means is engaged, each of said second clutch means being associated with the backward direction gear on each of the lay shafts associated with it so that said backward direction gear is connected to the lay shaft when the second clutch means is engaged, and said connecting means between the lay shafts and the final drive means being arranged so that one of the lay shaft drives the final drive means being arranged so that one of the lay shafts drives the final drive means associated with it to rotate in same direction with said one of the lay shafts and the other of the lay shafts drives the final drive means associated with it to rotate in a direction opposite to said the other of the lay shafts.

3. The tractor as claimed in claim 2 wherein a second gear larger than the first mentioned gear is fixedly mounted on the drive shaft and a second forward direction gear is rotatably mounted on each of said lay shafts, one of the second forward direction gears being combined in one body with a gear which is smaller than said one of the second forward direction gear and being in constant mesh with said second gear on the drive shaft, said second forward direction gears on the lay shafts being in constant mesh with each other, each of said power transmitting means further including a third fluid actuated clutch means for connecting said second forward direction gear associated with it to the lay shaft on which said second forward direction gear is mounted, each of said spools of the control valve means further having a fourth position in which said first and second clutch means associated with the spools are disengaged and said third clutch means associated with the spools is engaged, and said single maneuvering lever having a further or second forward direction position in which said first connecting member positions both of the spools in said fourth positions thereof due to displacement of said lever from said forward direction position to this second forward direction position along said first direction.

4. The tractor as claimed in claim 3 wherein a lever guide for said single maneuvering lever is provided which has a first guide groove extending along said first direction and a second guide groove extending along said second direction and crossing said first guide groove, said maneuvering lever being inserted in said guide grooves of the lever guide so that said lever may be positioned in a neutral position at the crossing of the guide grooves, in a first forward direction position at one side of said crossing in the first guide groove, in a second forward direction position at further one side of said crossing in the first guide groove, in a backward direction position at the other side of said crossing in the first guide groove, in a left spin-turn position at one side of said crossing in the second guide groove, and in a right spin-turn position at the other side of said crossing in the second guide groove, an inner face of said crossing being provided with four engaging steps which restrain once further displacements of said maneuvering lever respectively when said lever is returned from each of said first forward direction position, backward direction position, left spin-turn position and right spin-turn position to said neutral position, an inner face of said first guide groove being provided at the boundary between said first and second forward direction positions with two engaging steps which restrain once further displacements of the maneuvering lever respectively when said lever is displaced from the neutral position to the first forward direction position and from the second forward direction position to the first forward direction position.

5. The tractor as claimed in claim 1 wherein said first connecting member is a shifter which is moved along the longitudinal direction of said spools by displacing said single maneuvering lever along said first direction, and said second connecting member is a rotatable device which is rotatably mounted on said shifter by a shaft positioned between said spools so as to be rotated by displacing said single maneuvering lever along said second direction, said shaft being engaged with one ends of said spools by a pair of arms which are projected from the shaft.

6. The tractor as claimed in claim 1 wherein said first and second connecting members are composed of a common shifting device which is secured to the lower end of said single maneuvering lever and has a groove extending along a direction perpendicular to said spools, a pair of rod members engaged with said spools, each rod member having a ball-shaped end portion received by the groove of the common shifting device, whereby said shifting device is moved along the longitudinal direction of the spools by displacing said single maneuvering lever along said longitudinal direction to cause movement of both of the spools in the same direction at a time and is spun about the maneuvering lever by rotating said lever to cause movement of the spools in opposite directions at a time.

7. The tractor as claimed in claim 1 wherein a lever guide for said single maneuvering lever is provided which has a first guide groove extending along said first direction and a second guide groove extending along said second direction and crossing said first guide groove, said maneuvering lever being inserted in said guide grooves of the lever guide so that said lever may be positioned in a neutral position at the crossing of the guide grooves, in a forward direction position at one side of said crossing in the first guide groove, in a backward direction position at the other side of said crossing in the first guide groove, in a left-spin turn position at one side of said crossing in the second guide groove, and a right spin-turn position at the other side of said crossing in the second guide groove, an inner face of said crossing being provided with four engaging steps which restrain once further displacements of said maneuvering lever respectively when said lever is returned from each of said positions of the lever besides said neutral position to the neutral position.

8. The tractor as claimed in claim 1 including a pair of pedals for individually actuating each of said brake means, a pair of change-over valve means each having a spool associated with each of said control valve means, the spool of each of said change-over valve means having a normal position in which supply of pressure fluid to the control valve means associated with it is afforded and an operated position in which pressure fluid is tanked from the control valve means associated with it, a pair of cooperating means each of which operatively connects each of said pedals to each of said spools of the change-over valve means so that each of the spools of the change-over valve means is displaced from said normal position to said operated position when each of the pedals is operated.

9. The tractor as claimed in claim 8 wherein each of said brake means is loosely connected to each of said pedals for delaying actuation of said each brake means whereby each brake means is actuated after displacement of each of said spools of the change-over valve means from said normal position to said operated position.

* * * * *